United States Patent
Beckmann

(10) Patent No.: US 6,269,729 B1
(45) Date of Patent: Aug. 7, 2001

(54) SHAFT FOR A DRIVEN MAGAZINE

(75) Inventor: Rudi Beckmann, Aichhalden (DE)

(73) Assignee: Heckler & Koch GmbH, Oberndorf/Neckar (DE)

( * ) Notice: Subject to any disclaimer, the term of this patent is extended or adjusted under 35 U.S.C. 154(b) by 0 days.

(21) Appl. No.: 09/434,029

(22) Filed: Nov. 4, 1999

Related U.S. Application Data
(60) Provisional application No. 60/131,828, filed on Apr. 29, 1999.

(30) Foreign Application Priority Data

Apr. 29, 1999 (DE) ............................................... 199 19 617

(51) Int. Cl.⁷ ....................................................... F41A 9/00
(52) U.S. Cl. ........................ 89/33.14; 89/33.01; 89/33.1; 89/33.2; 89/35.01
(58) Field of Search ................................. 89/33.14, 33.2, 89/35.01, 33.17

(56) References Cited

U.S. PATENT DOCUMENTS

| | | | |
|---|---|---|---|
| 2,488,679 | * | 11/1949 | Nobles . |
| 3,429,220 | * | 2/1969 | Goode . |
| 3,706,260 | * | 12/1972 | Rausing . |
| 4,004,491 | * | 1/1977 | Seeling . |
| 4,122,933 | * | 10/1978 | Starzyk . |
| 4,392,414 | * | 7/1983 | Koine . |
| 4,429,615 | * | 2/1984 | Morris . |
| 4,941,393 | * | 7/1990 | Dodd et al. . |
| 5,107,750 | * | 4/1992 | Buchstaller et al. . |
| 5,353,679 | * | 10/1994 | Nordmann . |

FOREIGN PATENT DOCUMENTS 36 44 513 C1   6/1988 (DE) .

* cited by examiner

Primary Examiner—Michael J. Carone
Assistant Examiner—Troy Chambers
(74) Attorney, Agent, or Firm—Marshall, O'Toole, Gerstein, Murray & Borun

(57) ABSTRACT

Disclosed herein is an apparatus for separating consecutive cartridge-receiving cells of a driven magazine for an aircraft-mounted machine gun or cannon. The apparatus includes an elongated, substantially cylindrical shaft constructed of a fiber-reinforced plastic, wherein the shaft has end portions designed for attachment to a movable transport chain, and a middle portion defined by a driver constructed of an elastomer. The driver preferably dampens the gravitational forces introduced to the shaft.

8 Claims, 1 Drawing Sheet

SHAFT FOR A DRIVEN MAGAZINE

CROSS-REFERENCE TO RELATED APPLICATION

This application claims the benefit of U.S. provisional patent application Ser No. 60/131,828 filed Apr. 29, 1999, the disclosure of which is hereby incorporated herein by reference.

BACKGROUND OF THE INVENTION

1. Field of the Invention

The invention generally relates to ammunition magazines for automatic weapons and, more specifically, the invention relates to an apparatus for separating consecutive cartridge-receiving cells of a driven magazine for a rapid-fire weapon, such as an aircraft-mounted cannon or machine gun, for example.

2. Brief Description of Related Technology

Modern combat aircraft desirably fly at high speeds. Accordingly, cannons and machine-guns mounted on the aircraft must fire at an extremely rapid rate (number of shots per time unit), in order to achieve satisfactory coverage of stationary targets, as well as those targets moving at high speeds. Such cannons and machine guns are equipped with a driven magazine wherein the magazine cartridges are arranged between two transport (or drive) chains connected to each other by transversely running shafts. The transport chains run at a high speed to meet the firing demands of the cannon or machine gun. A cell capable of accepting a full or empty magazine cartridge is formed (defined) by two shafts arranged consecutively between the transport chains.

The transport chains move stepwise with the frequency of the cannon's firing sequence. During this stepwise movement, the shafts abruptly accelerate and again brake the cartridges lying between them at the beginning and end of each step. Furthermore, the magazine cartridges oftentimes have a comparatively high weight. Therefore, the shafts are subjected to an abrupt, alternating (jerky) load in the transverse direction during each step of the transport chain.

These jerky loads create longitudinal oscillations in the two transport chains and transverse oscillations in the shafts. The ends of the shaft that are inserted into (i.e., connected to) the moving transport chains as well as the center portion of the shaft are all critical sites requiring high strength and the capacity to adequately dampen the undesirable oscillations. Since the two types of oscillation can supplement each other unfavorably, prior art shafts have been made of high-strength steel, in order to guarantee the required strength and durability. A so-called driver, having the shape of a ring protruding over the shaft, also has been disposed at the center of the shaft to ensure that gravitational forces acting on the corresponding cartridges are introduced to the shaft at a defined site, preferably at or near the location of the driver. The flexibility of the shaft is reduced at this site because of the driver.

Because of its superior strength and the high alternating bending loads placed on the shafts, high-strength steel continues to be the only material used to construct durable shafts. High-strength steel shafts are quite heavy and undesirably increase the total weight of the magazine significantly. Such magazines have been known for decades and attempts have been made to replace the steel shafts with shafts made of a lighter yet equally strong and durable material. All previous attempts, however, were unsuccessful. For example, aluminum is not suitable because it is insufficiently stable. Fiber reinforcements in aluminum also are not suitable since the fibers are stressed in the transverse direction (i.e., a direction in which the endurance of fibers is limited). Plastic also is not suitable because it does not possess sufficient durability. Titanium is economically unsuitable due to its relatively high cost.

SUMMARY OF THE INVENTION

In accordance with the teachings of the invention, an apparatus is provided for separating consecutive cartridge-receiving cells of a driven magazine for a rapid-fire weapon. The apparatus includes an elongated, substantially cylindrical shaft comprised of fiber-reinforced plastic. The shaft has end portions designed for attachment to a transport chain, and a middle portion defined by a driver consisting essentially of an elastomer.

Further aspects and advantages of the invention may become apparent to those skilled in the art from a review of the following detailed description, taken in conjunction with the sole drawing figure and the appended claims. While the invention is susceptible of embodiments in various forms, described hereinafter are specific apparatus constructed in accordance with the teachings of the invention. These examples are provided as illustrations, and are not intended to limit the invention to the specific apparatus described herein.

BRIEF DESCRIPTION OF THE DRAWING

The sole drawing FIGURE illustrates a partial, schematic view of an elongated, substantially cylindrical shaft and a driver disposed about the shaft constructed in accordance with the teachings of the invention.

DETAILED DESCRIPTION OF THE PREFERRED EMBODIMENTS

Figure 1:
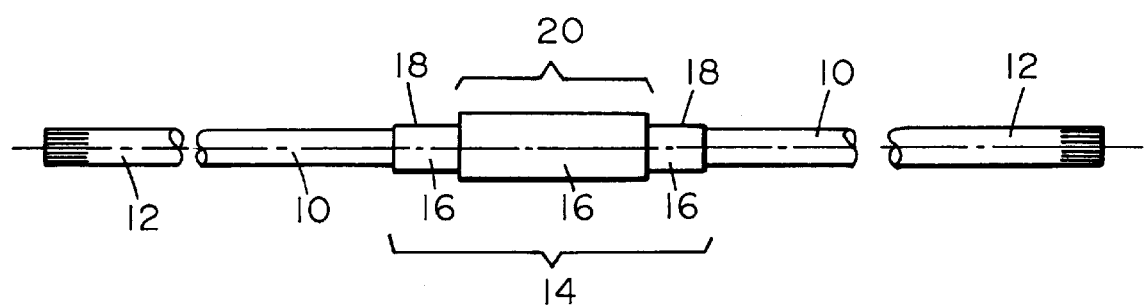

An exemplary apparatus for separating consecutive cartridge-receiving cells of a driven magazine for a rapid-fire weapon is shown in the sole drawing FIGURE. The apparatus includes an elongated, substantially cylindrical shaft 10 comprised of fiber-reinforced plastic. The shaft 10 has end portions 12 designed for attachment to a transport chain, and a middle portion 14 defined by a driver 16 comprised of an elastomer.

The cylindrical shaft 10 (also referred to sometimes as a "rod") includes ends 12 and a middle or center portion 14. The shaft 10 comprises and preferably consists essentially of and/or consists of fiber-reinforced plastic. Suitable fiber-reinforced plastics include, but are not limited to, carbon fiber-reinforced plastics (i.e., carbon fiber composites) and glass fiber-reinforced plastics. A preferred fiber-reinforced plastic is carbon fiber-reinforced plastic.

The driver 16 is disposed about the middle or center portion 14 of the shaft 10. The driver 16 preferably is shaped like a cylindrical sleeve having tapered or thin-walled ends 18. In a preferred embodiment, the driver 16 itself has a middle or center portion 20 that has a diameter larger than that of its tapered or thin-walled ends 18. Furthermore, in a preferred embodiment, the driver is molded onto the shaft 10. The driver 16 is constructed of an elastomer. Preferably, however, the driver 16 consists essentially of and/or consists of an elastomer. A suitable elastomer includes, but is not limited to, a rubber.

Preferably, the ends 12 of the shaft 10 are finely, longitudinally ribbed, in order to be accommodated free of rotation in the holes of the transport chain (not shown).

Oscillation damping is possible because the crests of the ribs can be pressed together easily and because of the material(s) of construction (plastic and carbon fibers) specified for the shaft 10.

The disclosed shaft 10 is advantageous over the prior art shafts in that the disclosed shaft 10 has a reduced weight, yet comparable strength. One could start from adapting the cross section of a shaft to the expected load and designing the shaft as a tube with an oval cross section, whose greater axis points in the running direction of the transport chain. One could also use titanium alloys, for example, the high-cost of which could be offset by increasing the useful load of the aircraft. However, the disclosed shaft 10 pursues a completely different path, by utilizing a fiber-reinforced material for the shaft, which heretofore has not been viewed as sufficiently strong, and an elastomeric material for the driver 16.

The elastomer preferably always acts as a damping element for the introduced, abrupt forces. The hysteresis inherent to elastomers converts the kinetic energy of such forces into heat. While not intending to be bound by any particular theory, it is assumed that the elastomer does not transfer the discontinuous impact loads originating from the inertia of the cartridges unaltered, but smoothes the discontinuities. For example, a graph of a force trend in a force-path diagram would have steep edges and particularly sharp peaks during introduction of the force into the elastomer, whereas in the transition of the force from the elastomer to the shaft 10, flatter edges and gently rounded peaks would be present.

The shaft 10 is designed as an elongated, substantially cylindrical element, whose continuous cross-sectional trend, and thus the fiber trend, is not adversely influenced by the one-piece design of the driver 16. The driver 16 preferably is mounted or molded onto the shaft 10 in each case. The transverse forces are distributed in the shaft 10 over the length of the driver 16 and are introduced strongly dampened, such that the transverse loads of the fibers in the shaft 10 diminish to a value that the fibers can withstand.

In a preferred embodiment, the fiber-reinforced plastic shaft 10 also forms an element that has a phase-shifting, damping effect. Substitution of the fiber-reinforced plastic shafts 10 for the high-strength steel shafts would not be expected to attain desired results because the substituted fiber-reinforced plastic shafts 10 would oscillate phase-shifted relative to the chain and, therefore, would not eliminate the harmful overall oscillation.

According to a preferred embodiment of the invention, carbon reinforced-fibers are particularly suitable as they have an extremely high longitudinal strength. The longitudinal strength produces very high bending rigidity of the shafts 10. Carbon reinforced-fibers have limited transverse strength. The elastomeric driver 16 compensates for the limited transverse strength of the shaft 10 by sufficiently dampening transverse stresses such that these stresses do not surpass the strength of the fibers.

Accordingly, it is particularly advantageous if the driver 16 is designed as an elongated, cylindrical sleeve, whose ends 18 have lower wall thickness than its center region 20. Such a driver 16 ensures that the bending rigidity of the sleeve 16 diminishes toward its ends 18, such that no discontinuity site appears during force transfer. In a driver sleeve with continuously equal wall thickness, a discontinuity wave may undesirably occur at or near its end. The length of the sleeve 16 is then preferably about one-seventh of the length of the shaft 10, and the length of one end 18 of the sleeve 16 preferably is about one-fifth of the total length of the sleeve 16. The sleeve 16 also can diminish gradually in wall thickness toward its ends without departing from the scope or spirit of the invention.

The driver sleeve 16 can be glued, pushed, pressed, shrunken, molded, or mounted onto the shaft 10. Preferably, however, the driver sleeve 16 is mounted or molded onto the shaft 10. A particularly intimate connection with the shaft 10 is attained when the driver sleeve 16 is molded onto the shaft 10. This intimate connection prevents discontinuities during force transfer.

The ends 12 of the shaft 10 are positioned in receiving holes of the transport chains (not shown) and, in contrast, to the known shafts, are pressed into these receiving holes. Accordingly, the ends 12 of the shaft 10 are longitudinally ribbed. In contrast to ribbed steel bolts, the ribs of the shaft 10 do not deform the surface of the holes. Furthermore, the ribs are easily pressed wide and form damping elements such that oscillation transfer from the transport chains to the shaft 10 is desirably hampered.

Preferably, the shafts 10 are not rotated during operation. This expedient also contributes to the endurance of the shafts 10.

By the foregoing teachings of the invention, one skilled in the art can construct shafts from lighter weight material than conventional high-strength steel. Furthermore, the foregoing teachings now make possible the construction of light weight shafts having a durability equal to and/or greater than that of the conventional high-strength steel. Such shafts are capable of accommodating the high-alternating bending loads placed on the shafts.

The foregoing description is given for clearness of understanding only, and no unnecessary limitations should be understood or imported to the claimed invention therefrom. Modifications within the scope of the invention may be apparent to those having ordinary skill in the art and such modifications are intended to fall within the scope of the appended claims.

What is claimed is:

1. An apparatus for separating consecutive cartridge-receiving cells of a driven magazine for a rapid-fire weapon, the apparatus comprising an elongated, substantially cylindrical shaft comprising a fiber-reinforced plastic, wherein the shaft has end portions designed for attachment to a transport chain, and a middle portion defined by a driver comprising an elastomer.

2. The apparatus of claim 1, wherein the fiber-reinforced plastic is a carbon fiber composite.

3. The apparatus of claim 1, wherein the driver is defined by an elongated, substantially cylindrical sleeve.

4. The apparatus of claim 3, wherein ends of the sleeve have a reduced wall thickness relative to a central portion of the sleeve.

5. The apparatus of claim 1, wherein the driver is molded onto the shaft.

6. The apparatus of claim 1, wherein the shaft ends are longitudinally ribbed.

7. The apparatus of claim 1, wherein the elastomer is rubber.

8. An apparatus for separating consecutive cartridge-receiving cells of a driven magazine for a rapid-fire weapon, the apparatus comprising an elongated, substantially cylindrical shaft consisting essentially of fiber-reinforced plastic, wherein the shaft has end portions designed for attachment to a transport chain, and a middle portion defined by a driver consisting essentially of an elastomer.

\* \* \* \* \*